United States Patent

Broussard, Sr.

[11] Patent Number: 5,009,787
[45] Date of Patent: * Apr. 23, 1991

[54] LIQUID-TO-LIQUID OIL ABSORPTION METHOD

[76] Inventor: Paul C. Broussard, Sr., P.O. Box 32504, Lafayette, La. 70503

[*] Notice: The portion of the term of this patent subsequent to Mar. 1, 2005 has been disclaimed.

[21] Appl. No.: 286,234

[22] Filed: Dec. 19, 1988

Related U.S. Application Data

[63] Continuation of Ser. No. 160,864, Feb. 26, 1988, Pat. No. 4,839,043, which is a continuation-in-part of Ser. No. 938,397, Dec. 5, 1986, Pat. No. 4,728,428.

[51] Int. Cl.$^5$ .............................................. B01D 12/00
[52] U.S. Cl. ..................................... 210/634; 210/804; 210/805
[58] Field of Search ......................... 210/634, 805, 804

[56] References Cited

U.S. PATENT DOCUMENTS

| | | | |
|---|---|---|---|
| 3,810,346 | 5/1974 | Uratani | 55/29 |
| 4,060,912 | 12/1977 | Black | 34/9 |
| 4,124,502 | 11/1978 | Leman | 210/634 |
| 4,515,695 | 5/1985 | Knupp | 210/634 |
| 4,728,428 | 3/1988 | Broussard | 210/634 |

Primary Examiner—Ivars Cintins
Attorney, Agent, or Firm—George A. Bode; D. Neil LaHaye

[57] ABSTRACT

A system for removing dissolved and undissolved oil from contaminated water which recycles and reclaims absorbing fluid. An absorbing fluid ($CCl_2FCClF_2$) is used in a wet-spiral mixer-absorber-contactor to absorb oil contaminants in produced-water. A downflow spreader system in a processing separator separates the heavier oil absorbing fluid from the oil-decontaminated water. Unspent absorbing fluid is recycled to the absorber-contactor and the decontaminated water is released into the surrounding environment. Spent absorbing fluid is reclaimed in a distillation treatment unit where the oil is used as fuel oil or stored. The absorbing fluid's vapors are drawn off under vacuum from the distillation unit by a jet eductor pump, mixed and condensed with the decontaminated water which drives the jet pump, and then redirected into the system for reuse.

5 Claims, 2 Drawing Sheets

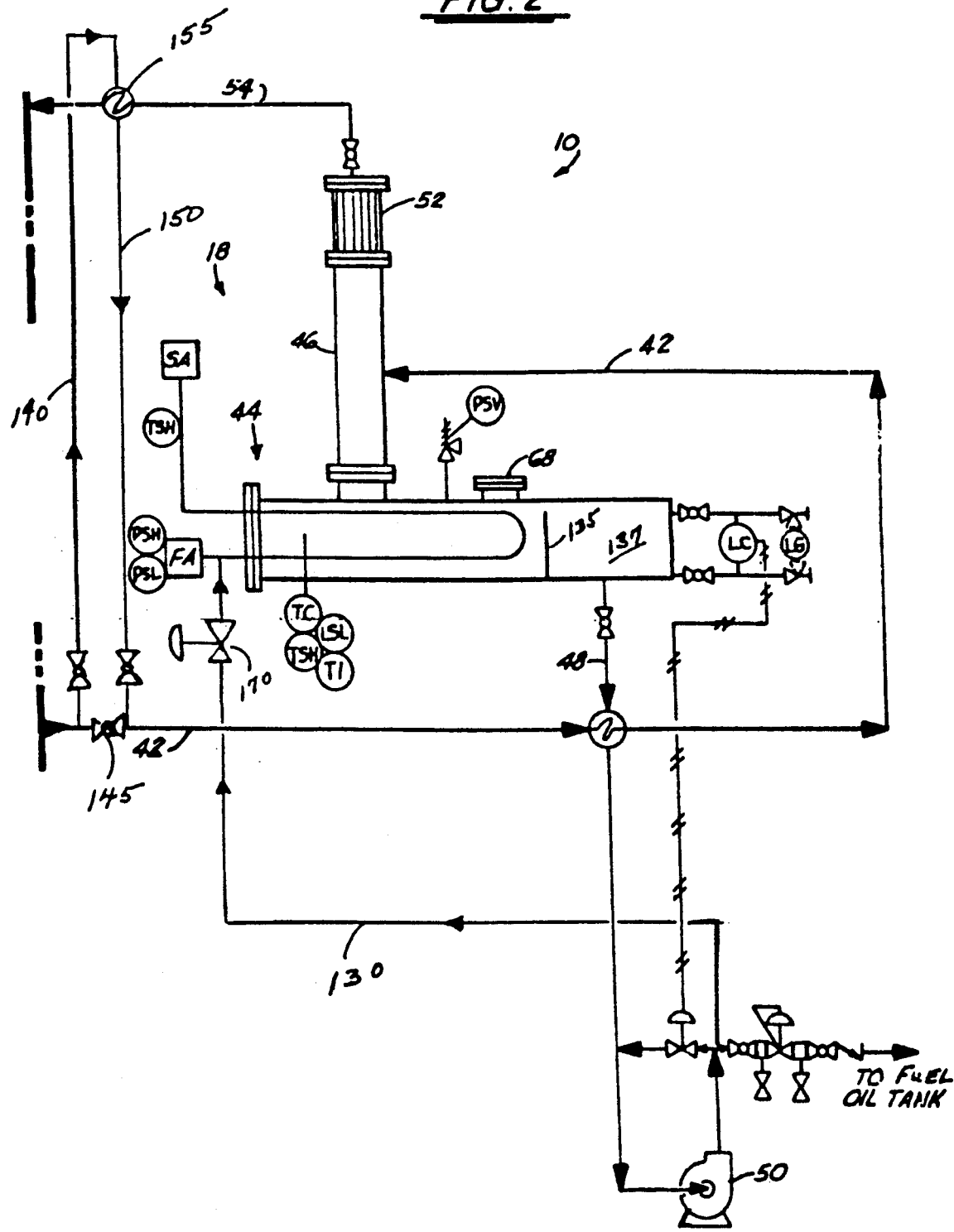

LIQUID-TO-LIQUID OIL ABSORPTION METHOD

This is a continuation of application Ser. No. 160,864, filed Feb. 26, 1988, now U.S. Pat. No. 4,839,043, which is a continuation-in-part application of Ser. No. 06/938,397 filed Dec. 5, 1986 (now U.S. Pat. No. 4,728,428 issued Mar. 1, 1988). This prior application, including the specification, claims, and the drawing figures are included herein, as if fully set forth below, as part of the specification by reference.

BACKGROUND OF THE INVENTION

1. Field of the Invention

The present invention is related generally to the decontamination of fluids and in particular, to the removal of grease or oil from water.

2. General Background

In the offshore oil and gas production industry, water (produced-water) is produced with oil. As a result of such production of oil and water, the water is often contaminated with oil. Present U.S. Environmental Protection Agency (EPA) interim guidelines on offshore produced-water treatment and disposal require that less than forty-eight (48) ppm of effluent-oil concentration must be present in produced-water prior to disposal into the surrounding offshore waters. This makes it desirable and necessary to improve the quality of such produced-water prior to disposal.

Various treatment techniques used in the industry include: free-water knockout (FWKO), skim tanks, plate coalescers, skim piles and flotation units, particularly flotation separators using multi-stage gas-air eductors or vigorous mixing of produced-water with gas-air to form a froth to float the oil to the surface for skimming and leaving a water with some oil contaminants.

Devices and methods addressing the above problems of which applicant is aware include the following:

U.S. Pat. No. 4,627,922 to Viator, et al. (the applicant was a co-inventor) entitled "Method Of Removing Dissolved Oil From Produced Water" discloses a method of removing dissolved oil from produced water by turbulently contacting gaseous dichlorodifluoromethane ("Freon 12") with the water to create bubbles that move dissolved oil particles to the surface of the water and removing freed dissolved oil from the surface. This method teaches neither absorption to remove oil from produced-water nor a reclaiming step as taught by applicant, but rather a "flotation" or ionic effect to break the bonds solvating the oil to separate it.

U.S. Pat. No. 4,060,912 entitled "Absorber-Contactor" discloses a system for removing contaminants, such as vapors and condensibles, from gas which includes a tortuous or spiral path-forming container wherein the contaminated gas is caused to repeatedly pass through a layer of absorbent fluid.

U.S. Pat. No. 4,094,783 entitled "Centrifugal Flotation Separator" issued to G.F. Jackson discloses a multi-stage, recycling, centrifugal flotation separator system. A closed circular cylindrical vessel has a tray or baffle positioned inside the vessel near the top with an axial opening for the upward flow of froth and gas bubbles. Contaminated liquid and air under pressure are introduced into the vessel through tangential pipes to form bubbles. Gas released at the top of the vessel and liquid from the bottom zone are recycled into the vessel. The clean liquid is drawn from the bottom of the tank close to the outer wall.

U.S. Pat. No. 3,542,675 entitled "Water Treatment" issued to I.P. Mail, et al. discloses the flowing of liquid saturated with gas into a container and through a venturi structure which reduces the pressure on the saturated liquid to enable gas bubbles to form. The flow rate of the gasified liquid is controlled to maintain a predetermined ratio to the flow rate of the contaminated liquid flowing through the container.

While the above have demonstrated a certain degree of effectiveness in removing oil contaminants, a higher degree of efficiency has been sought in the industry.

SUMMARY OF THE PRESENT INVENTION

The preferred embodiment of the system and method of the present invention solves the aforementioned problems in a straightforward and simple manner. What is provided is a system which uses an absorbing fluid and causes the absorbing fluid to have a greater degree of contact with the oil contaminants in the produced-water. The produced-water is directed into a wet spiral absorber-contactor and then to a separator having a downflow spreader system wherein the clean water and absorbing fluid containing the oil contaminants are separated; however, the water will still have a residual amount of the absorbing fluid (or solvent). The produced-water with residual solvent is then introduced into an absorbing fluid recovery separator wherein the absorbing fluid is separated from the produced-water under vacuum. The clean water is then released into the surrounding environment. The absorbing fluid that is recovered not completely spent is recycled to the absorber-contactor for further use. Absorbing fluid that is spent is directed to reclaiming means wherein the absorbing fluid is treated by a vacuum distillation process so that it may be reused. Means for reintroducing reclaimed absorbing fluid into the system is also provided. The oil that is removed from the absorbing fluid may be used as a source of fuel for heating during the vacuum distillation process.

In view of the above, it is an object of the present invention to provide a liquid-to-liquid oil absorption system and method for oil decontaminating produced-water of greater efficiency than presently existing systems.

It is another object of the present invention to provide a system which recycles absorbing fluid.

In view of the above objects it is a feature of the present invention to provide a separator for recycling unspent absorbing fluid.

It is another feature of the present invention to provide a distillation system for reclaiming spent absorbing fluid.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 2 is a schematic illustration of that portion of the system illustrating the vacuum distillation unit.

DETAILED DESCRIPTION OF THE PREFERRED EMBODIMENT

Figure 1:
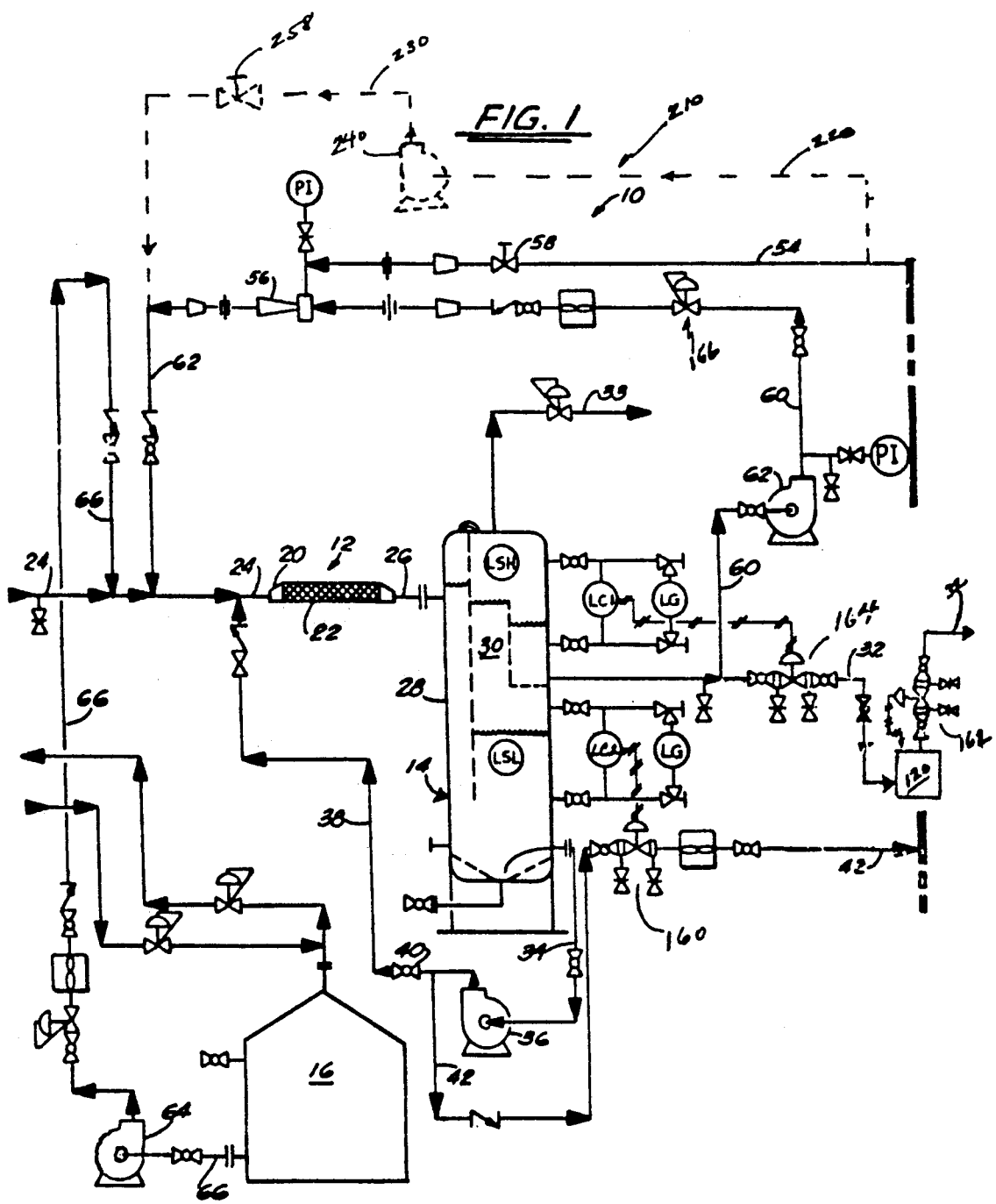
FIG. 1 is a schematic illustration of that portion of the system of the present invention illustrating the wet spiral absorber-contactor, processing separator having a downflow spreader system, absorbing fluid recovery separator and storage tank.

Referring now to the drawing, it can be seen that the invention is generally referred to by the numeral 10. Liquid-to-liquid oil absorbing system (or "water degreasing" system) 10 is generally comprised of absorber means 12, processing separator means 14, absorbing fluid recovery separator 120, storage tank 16, and absorbing fluid reclaiming means 18.

Absorber means 12, illustrated schematically in FIG. 1, may be of any suitable type static mixer known in the industry, but in the preferred embodiment, is a wet-spiral absorber-contactor 20 as this has been found to produce the best results and reduce the retention time required for separation of the fluids in processing separator means 14. Absorber means 12 aids the absorbing fluid in its capacity to remove both dissolved oil and undissolved ("free" or "entrained" or "dispersed") oil with trichlorotrifluoroethane ($CCl_2F$—$CClF_2$) as the absorbing fluid. The mixing of oil contaminated ("produced") water and absorbing fluid in wet spiral absorber-contactor or mixer 20 allows the absorbing fluid to contact and absorb oil from the water. Absorber-contactor 20 (such as that taught in Black's U.S. Pat. No. 4,060,912, discussed in the Background Of The Invention section above) is comprised of a cylinder 22 having an inlet at line 24 for receiving produced-water (water-oil mixture) from a source (not shown) and absorbing fluid and an outlet at line 26 for directing the mixture of treated produced-water and absorbing fluid-contaminated oil mixture to processing separator means 14. Inside of cylinder 22 is a centrally located axially disposed shaft having a fin or fins spirally wrapped around and affixed thereto. Segments of plates, which may be notched, are connected to adjacent reaches of the spiral fins and assure that the produced water being treated dips into the absorbing fluid present in cylinder 22. In the preferred embodiment, the absorbing fluid used is a liquid fluorinated hydrocarbon, more particularly, trichlorotrifluoroethane ($CCl_2F$—$CClF_2$) commercially available from E. I. du Pont de Nemours & Co. as FREON 113 ®, (or FREON TF ®), Allied Signal, Inc. as GENESOLV D ®, etc. This fluid has the ability for removing both "free" (undissolved) oil and dissolved oil from the produced-water, the reason for which is that the trichlorotrifluoroethane ($CCl_2F$—$CClF_2$) (absorbing fluid) removes oil from oil-contaminated produced-water as has been demonstrated in water test requirements of the U.S. Environmental Protection Agency (U.S. EPA). The technique is known as "Utility System Water Samples" Module PD-G-11.

Processing separator means 14 receives the treated fluid from absorber-contactor 20 via line 26. Processing separator means 14 is preferably a vertical positioned vessel 28 and is generally comprised of a downflow spreader means or system 30. (Vessel 28 may, in an alternate embodiment, be a horizontally positioned vessel). Treated fluid (produced-water/absorbing fluid mixture) is received in vessel 28 through line 26 where spreader system 30 promotes separation of the oil-decontaminated water and absorbing fluid. As the absorbing fluid (trichlorotrifluoroethane ($CCL_2$—$CClF_2$) in liquid phase) has a higher specific gravity than water, the absorbing fluid and contaminants which have been removed from the produced-water settle through spreader system 30 to the lower end of vessel 28. It can thus be seen that oil-decontaminated water (but not as yet absorbing fluid decontaminated as the water has a residual amount of the absorbing fluid) targeted for release to the surrounding environment will be present near the top of vessel 28. Such oil-decontaminated water is drawn from the upper levels of spreader system 30 and produced-water containing produced-gas entrained therein is released from the system through gas outlet 33. The oil-decontaminated water drawn from the upper levels of spreader system 30 through control valve 164 is then introduced into vacuum separator or absorbing fluid recovery separator 120, preferably a vertical cylinder filled with a ceramic packing medium with a bottom inlet and top outlet. Oil-decontaminated water received at the bottom of absorbing fluid recovery separator 120 upflows through the ceramic packing medium wherein absorbing fluid is vaporized and removed under vacuum from the oil-decontaminated water, thereby producing "acceptable" water (water with less than 48 ppm of contaminants) which exits separator 120 through control valve 162 and is released from system 10 through water outlet 32.

During the earlier stages of processing the produced-water, the capacity of the absorbing fluid to absorb contaminants is not completely utilized. To provide for the most efficient use of the absorbing fluid, means for recycling the absorbing fluid through absorber-contactor 20 is provided. Line 34 provided near the bottom of vessel 2B draws off the absorbing fluid separated in processing separator means 14 and supplies the absorbing fluid to absorbing fluid pump 36 which pumps the absorbing fluid back into line 24 and absorber-contactor 20 via recycle line 38. When the level of absorbing fluid in the processing separator 14 increases due to oil-decontaminants in the absorbing fluid, the level control (LC 2) opens control valve 160 allowing oil-contaminated absorbing fluid to be diverted to the absorbing fluid reclaiming means 18 via treatment line 42. Provided in line 42 is diverter valve 145 which diverts flow from line 42 through line 140 to heat exchanger 155 wherein oil-contaminated absorbing fluid is preheated by absorbing fluid vapors in line 54. The preheated oil-contaminated absorbing fluid returns to line 42 via line 150.

In the preferred embodiment, absorbing fluid reclaiming means 18, best illustrated schematically in FIG. 2, is generally comprised of a distillation treatment vessel 44 having a heating area through which the absorbing fluid flows. Heating may be accomplished by hot liquid, electrical resistance heating and/or direct fire (preferably with recovered oil as a source of heat) with the controlling vaporizing temperature depending on the absorbing fluid being used. Absorbing fluid, more particularly trichlorotrifluoroethane ($CCl_2F$—$CClF_2$), is used in the preferred embodiment as it has a boiling point much lower than the contaminants it is being used to absorb. As the oil-contaminated absorbing fluid passes from line 42 into and through heating area 46 it is vaporized leaving the oil contaminants to flow over baffle plate 135 to oil surge section 137 of vessel 44 where the oil is collected and eventually passed through oil line 48 and oil pump 50 to either be used as a source of fuel to heat the oil-contaminated absorbing fluid in vessel 44 or passed to a fuel oil tank (not shown) for storage. To use oil discharged from line 48 as a source for fuel for heating the oil-contaminated absorbing fluid in vessel 44, control valve 170 is opened to allow passage of the fuel oil through line 130 to a burner protected by flame arrestor FA of vessel 44.

Control valve 170 is in turn controlled by temperature control TC of vessel 44.

Means for condensing the vapor of the treated or distilled absorbing fluid is provided by drawing the vapor upward through fin area 52, where it is cooled in preparation for condensation back into liquid form by eductor jet pump 56. Adjustable choke 58 is used to control the rate of vapor flow from area 52 through line 54 to jet pump 56.

Jet pump 56 is driven by treated oil-decontaminated water controlled by back pressure valve 166 which is drawn from water outlet 32 through line 60 and pumped by water pump 62 to jet pump 56. As the vapor and oil-decontaminated water are mixed together in jet pump 56, the water's cooling effect causes condensation of the vapor and the oil-decontaminated water/absorbing fluid mixture is directed back into line 24 via line 62 for reuse in absorber-contactor 20.

Storage tank 16 is used for storage of absorbing fluid which is required for make-up and recharging the water treating system. It is seen that fluid from tank 16 is supplied to line 24 through pump 64 and line 66.

To provide for ease of servicing of absorbing fluid reclaiming means 18, manway 68 is provided. As an option, a second vacuum distillation treatment vessel (not shown) may be provided depending on the size and capacity of the system and the oil concentration desired to be recovered from the produced-water. Naturally, all components of the system are designed to be constructed to meet ASME codes, offshore requirements and required safety systems.

In operation, as best illustrated schematically in FIG. 1, absorber means 12 receives produced-water to be decontaminated via line 24. Fins and plates on a shaft in absorber means 12 cause increased contact of the produced-water with absorbing fluid for efficient absorption of oil contaminant. The mixture of oil-decontaminated water and absorbing fluid containing oil contaminants is directed to processing separator means 14 through line 26. Downflow spreader system or means 30 promotes separation by allowing the heavier oil absorption fluid to settle to the bottom of vertical vessel 28. Unspent absorbing fluid is recycled to absorber means 12 and the treated water is directed to absorbing fluid recovery separator 120 wherein absorbing fluid is removed from the oil-decontaminated water thereby producing acceptable water. The water is released to the surrounding environment via line 32. Spent oil absorbing fluid is directed to absorbing fluid reclaiming means 18 via lines 34 and 42 (schematically from FIG. 1 to FIG. 2) where the absorbing fluid and contaminants are separated by a vacuum distillation process for reclaiming the absorbing fluid for further use. Separated oil is selectively directed to either use as a fuel to heat vessel 44 or storage in a fuel oil storage tank and then for use as fuel oil. Absorbing fluid vapor is drawn off by eductor jet pump 56 where it is condensed by mixing with treated water drawn from line 32, the treated water also driving jet pump 56. The absorbing fluid and water mixture is then redirected to absorber means 12 for further use.

Vacuum pump system 210 (illustrated in phantom lines in FIG. 1) in another embodiment of the invention could replace vacuum jet system 62-56-166. In this embodiment suction line 220 of vacuum pump 240 is piped into line 54—the vapor outlet of vacuum distillation treatment vessel 44. Discharge line 230 of vacuum pump 240 is piped into line 62 and includes an adjustable choke valve 258 to control the rate of flow of vapor to line 62. Vacuum pump 240 would allow the absorbing fluid vapor to be pumped back into absorber-contactor 20 for recycle. Jet system 62-56-166 is preferred as it is more efficient, thereby costing less to operate.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for degreasing water, which comprises contacting contaminated produced-water with a volatile non-water-soluble liquid fluorocarbon to dissolve both dissolved and suspended contaminants from said produced-water; separating the spent fluorocarbon from the degreased water; and, recycling separated spent fluorocarbon to the contacting step by means of an eductor jet pump driven by said degreased water.

2. The method of clam 1, in which the fluorocarbon is trichlorotrifluoroethane.

3. The method of claim 1, in which the contact step is effected in a wet-spiral absorber-contactor.

4. The method of claim 1, in which the separated spent fluorocarbon is volatilized to separate it from the dissolved contaminants and the vapors are condensed to provide purified liquid fluorocarbon for recycle to the contacting step.

5. The method of claim 1, and further including, recycling unspent fluorocarbon to the contacting step.

* * * * *